March 12, 1940.  C. F. REIS  2,192,985
ELECTRIC GENERATING APPARATUS
Filed Nov. 19, 1937  3 Sheets-Sheet 1
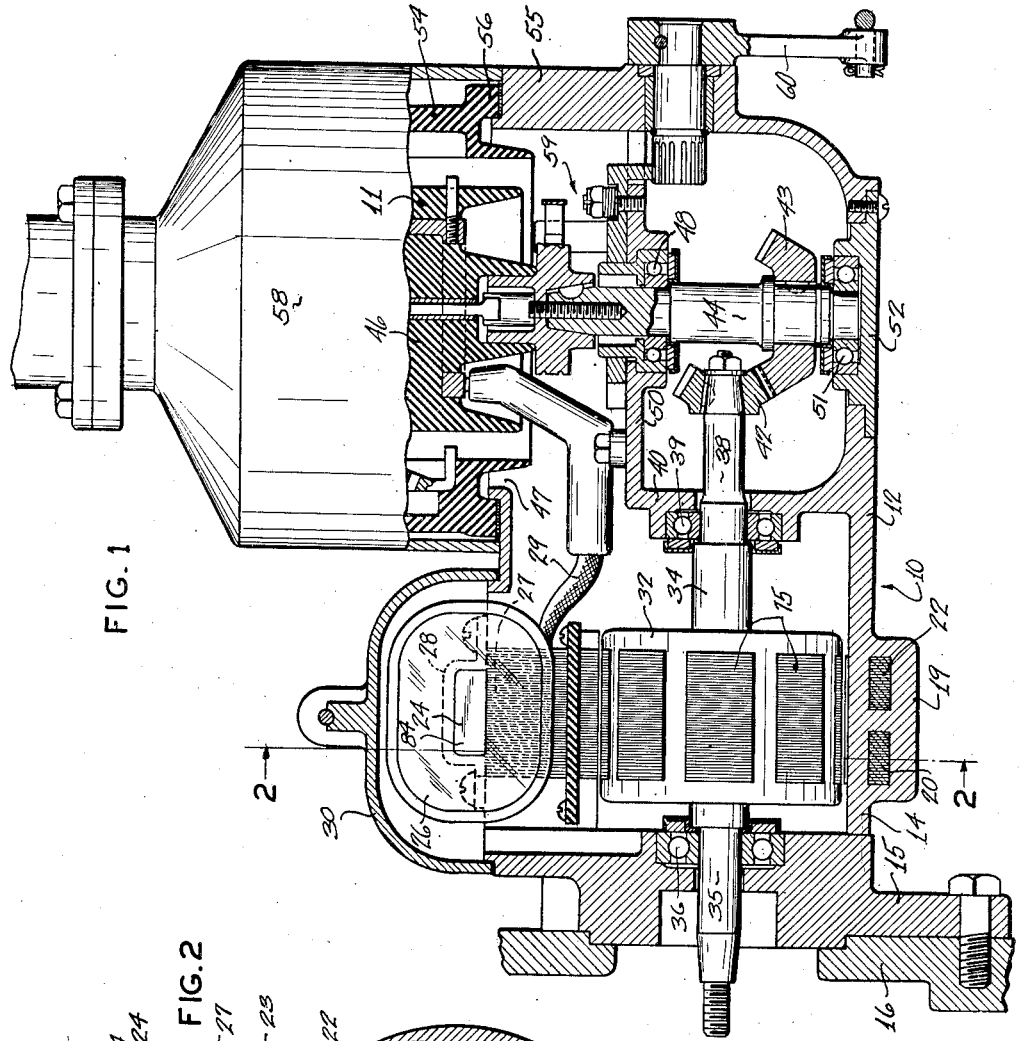
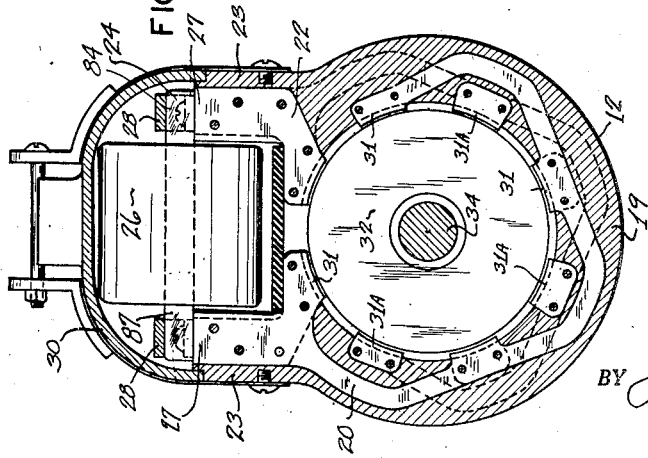
INVENTOR.
CURT F. REIS
BY Paul L. Kirker
ATTORNEY.

March 12, 1940.  C. F. REIS  2,192,985
ELECTRIC GENERATING APPARATUS
Filed Nov. 19, 1937  3 Sheets-Sheet 2
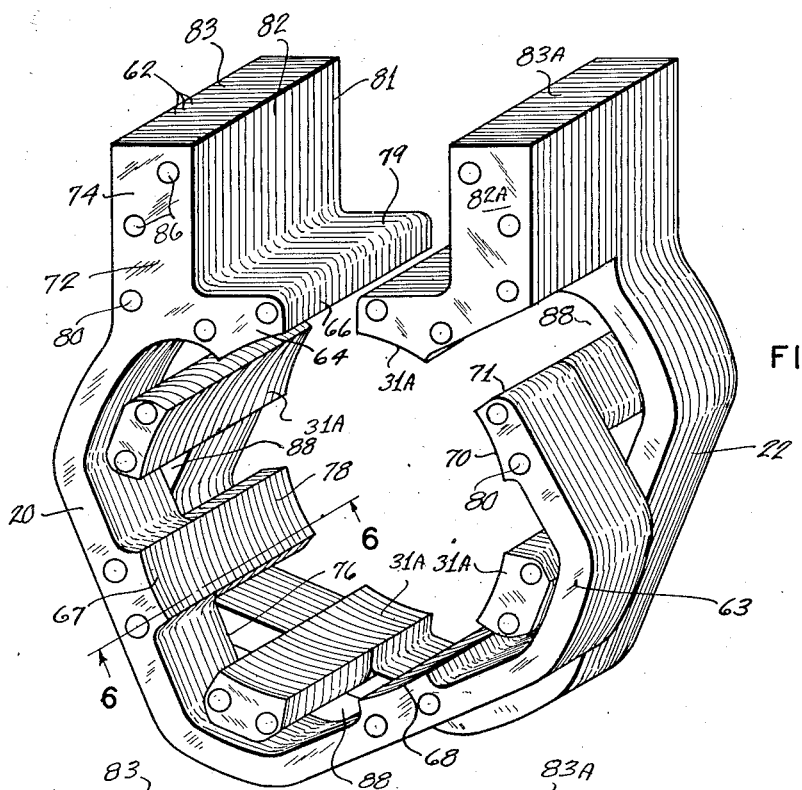
FIG.3
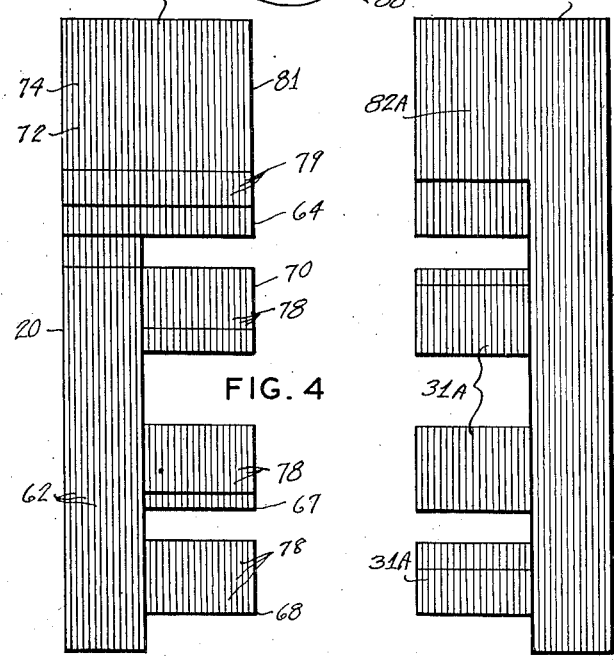
FIG.4   FIG.5
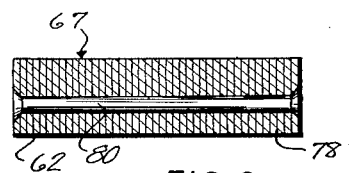
FIG.6
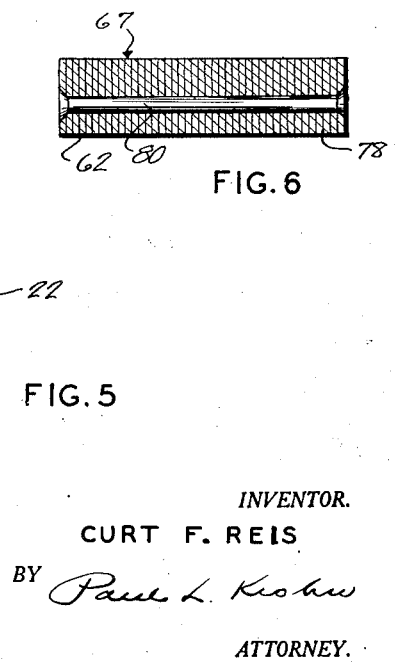
*INVENTOR.*
CURT F. REIS
BY Paul L. Krohn
*ATTORNEY.*

March 12, 1940.  C. F. REIS  2,192,985
ELECTRIC GENERATING APPARATUS
Filed Nov. 19, 1937  3 Sheets-Sheet 3
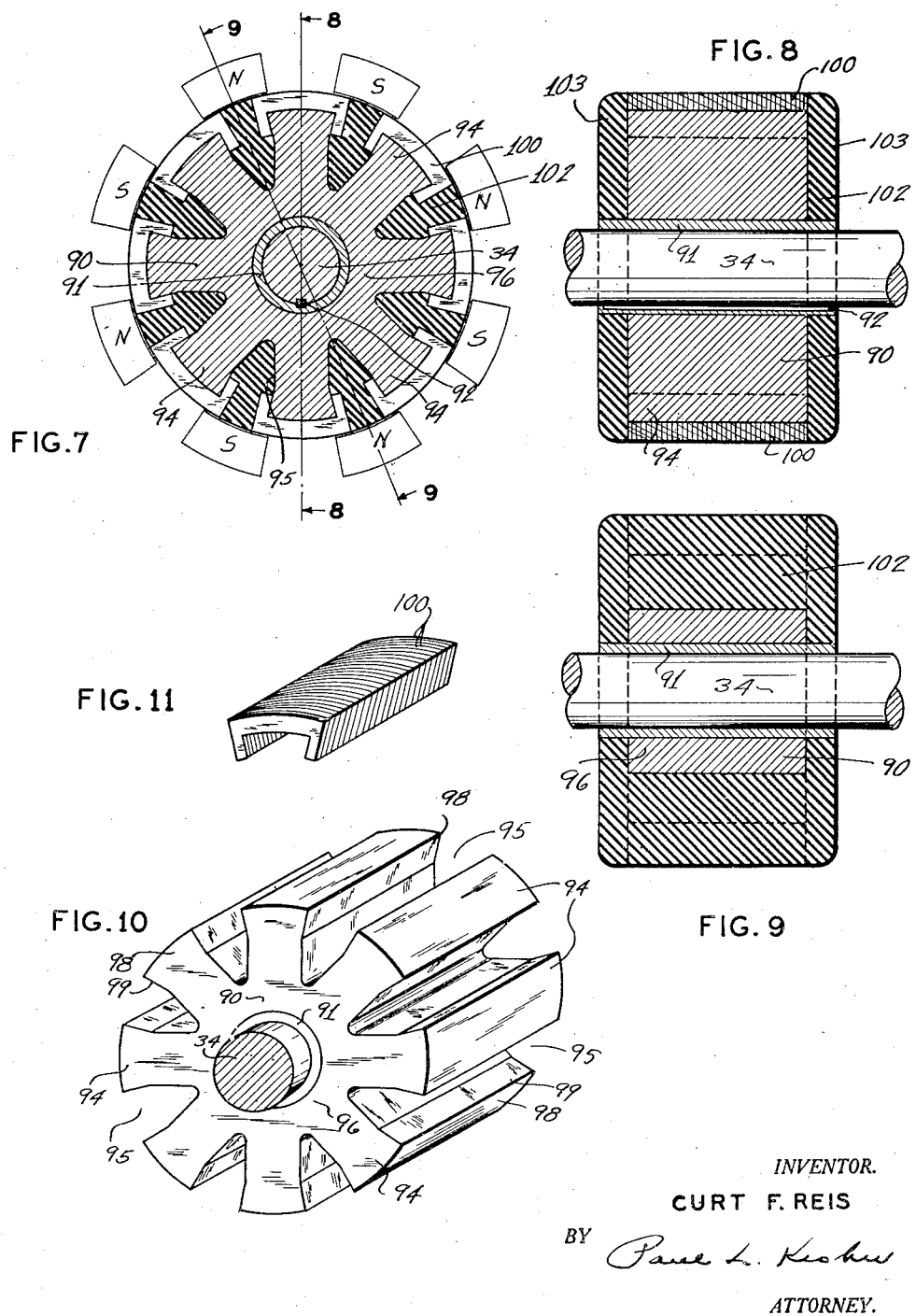
INVENTOR.
CURT F. REIS
BY Paul L. Keohn
ATTORNEY.

Patented Mar. 12, 1940

2,192,985

UNITED STATES PATENT OFFICE 2,192,985

ELECTRIC GENERATING APPARATUS

Curt F. Reis, Chicago, Ill., assignor to Superior Parts Manufacturing Company, New York, N. Y., a corporation of New York Application November 19, 1937, Serial No. 175,383

1 Claim. (Cl. 171—209)

This invention relates to electric generating apparatus, and more especially to an improved electric generator or magneto adapted particularly, for supplying ignition current for internal combustion engines and the like.

An object of the invention is to provide a greatly improved electric generator of the induction type, which is characterized by a high efficiency and large output, attained through a novel, compact arrangement of the magneto parts, so related as to produce a relatively large number of current impulses per revolution.

Another object is to provide in a generator of the type described, an improved stator or armature assembly, including complemental core members of laminated structure, each provided with a plurality of pole elements arranged for full operative cooperation with the generator rotor member, and a generating winding assembly functionally cooperating with said core members.

A further object is to provide an improved generator frame or housing, comprised of a single casting of a non-magnetic material, having the armature core members securely embedded in a portion thereof, with the armature pole elements projecting from the housing for cooperation with the generator rotor, the housing being adapted for operatively supporting the generator parts and certain control apparatus utilized therewith.

A further object resides in the provision in an ignition generator of the type described, of an improved rotor or field structure therefor, characterized by compactness of structure and a high efficiency in its function as the field or generating member of the magneto.

Yet another object lies in the provision of an improved generator rotor structure including a unitary magnetic core formed of a ferrous alloy having high magnetic retentivity characteristics, the core being cast onto a non-magnetic shaft, and formed to provide a plurality of equally radially spaced, polar projections which are permanently magnetized to provide alternate north and south poles.

Further objects and advantages of the invention will appear fully from the following description, as read in connection with the drawings, in which:

Fig. 1 is a longitudinal section of a preferred form of magneto generator assembly, including the magneto frame or housing and a magneto output control device, such as a distributor, the latter device being shown partly in section and partly in assembly elevation; Fig. 2 is a lateral section of the generator assembly, as viewed from line 2—2 in Fig. 1; Fig. 3 is an enlarged view in perspective, of complemental stator or armature core elements forming parts of the invention, the elements being shown in the relative positions which they occupy in assembly; Figs. 4 and 5 illustrate respectively, in end elevation, the complemental armature core elements of Fig. 3; Fig. 6 illustrates in enlarged section, a portion of one of the armature elements, as viewed from line 6—6 in Fig. 3; Fig. 7 is an enlarged, transverse section of the generator rotor assembly shown in Figs. 1 and 2; Figs. 8 and 9 are longitudinal sections of the rotor, as taken respectively, along lines 8—8 and 9—9 in Fig. 7; Fig. 10 is an elevation in perspective, of the permanent magnet core of the rotor, and Fig. 11 is an elevation in perspective of a preferred form of laminated pole piece or shoe for each of the polar projections provided by the rotor core.

Referring to the drawings by suitable characters of reference, the numeral 10 in Fig. 1, designates generally, a generator assembly embodying features of the invention, while 11 indicates generally, a generator output control device or distributor mechanism, the details of which are not fully illustrated or described herein, as this device of itself forms no part of the present invention. Both the generator and distributor are supported by a frame or housing 12 formed of a non-magnetic material, such as an aluminum alloy having the requisite tensile strength for this purpose, the housing by preference, being cast as a unitary structure. Where the generator assembly is to be utilized for ignition purposes in connection with an internal combustion engine, it may be mounted directly on a portion of the engine. Accordingly and by way of example of its application, the generator housing 12 may be secured at one end, in any suitable manner, to a member or plate 15, the plate in turn being secured to a frame portion 16 which may represent part of an engine structure (not shown) with which the magneto is to be utilized.

As shown by Figs. 1 and 2, housing 12 is formed to provide a substantially thickened, partly annular wall portion 19 adjacent the housing end 14, this portion having embedded therein stator core members 20 and 22, the structural details and operative arrangement of which will be hereinafter more fully described. The core members project through the upper part 23 of wall portion 19 to engage the opposite ends of a magnetic core or bar 24, the bar functionally cooperating with and serving as a support for a generator stator winding assembly 26. The bar is retained in assembly with its ends in magnetic contact with the core projections denoted generally at 27 in Fig. 2, as by clamps or strap elements 28. High tension current generated by the magneto, is conducted from the windings 26 through a lead 29, to the distributor device 11, in the manner shown by Fig. 1. Completing the enclosure of the winding assembly 26 by housing 12, is a removable cover structure 30, (Figs. 1 and 2).

The stator core members 20 and 22 provide respectively, a plurality of projections or poles 31 and 31A which extend inwardly of housing 12 and more particularly of the thickened wall portion 19, for cooperation with the generator rotor 32. The rotor structure and its features of novelty will be more fully pointed out hereinafter. Operatively supporting the rotor 32 is a shaft 34 which by preference, is formed of a non-magnetic material, such as a suitable high tensile strength bronze alloy. One end portion 35 of the shaft is operatively journalled in a suitable bearing 36 preferably of non-friction type, carried by the end plate 15, this end of the rotor shaft being extended through the plate and inwardly of frame portion 16 for driven connection with a rotating part of the engine, such as the engine crankshaft (not shown). The opposite end 38 of the shaft is rotatively journalled in a bearing 39 which may be similar to bearing 36, the bearing 39 being supported by a wall portion 40 extending inwardly of magneto housing 12 and by preference, formed as an integral part thereof. A beveled pinion 42 keyed or otherwise secured to the shaft end 38, operatively engages a gear element 43 secured to the lower end of a vertically arranged shaft 44 which operatively supports the rotating element 46 of the distributor device 11. The distributor rotor is shown as mounted on the upper end of shaft 44 and extending upwardly through an opening 47 in the housing 12. The upper end of shaft 44 is journalled for rotation in a bearing 48 carried by an extension 50 of the wall element 40, while the lower end of the shaft is journalled in a similar bearing 51 which by preference, is carried by a removable plate 52 forming a part of the housing 12. The distributor stator structure 54 which surrounds the rotor 46, is seated upon the wall portion 55 of housing 12, this wall portion which marginally defines the opening 47, being upwardly flanged at 56 as a means for properly locating the stator 54 with respect to the distributor rotor 46. A suitable cover 58 removably secured to housing 12 in any desired manner (not shown) serves in cooperation with the housing, to enclose the distributor mechanism. As shown by Fig. 1, the distributor apparatus includes mechanism indicated generally by numeral 59, for regulating the distributor to effect a desired timing of ignition current delivery to the engine fuel-charge igniting elements (not shown). Mechanism 59 is by preference, controlled exteriorly of the housing 12, through a control arm 60 which may be manually or automatically operated.

Turning now to the novel features of the generator stator structure illustrated by Figs. 2 through 6, and referring particularly to Fig. 3 thereof, the stator as before noted, is comprised of complemental core members 20 and 22. A description of one of the core members, say core 20, will suffice for both core members, as each is substantially identical in structure. However, the reference numerals applied to the parts of core 20 will be applied to the corresponding parts of core 22, with the addition of a letter suffix to each numeral. Core 20 is of laminated construction, being comprised in part of laminae 62 which are formed to present in transverse elevation, open-sided, substantially rectangular elements having somewhat rounded portions or corners 63. The laminae 62 are formed further, to provide in assembly, inwardly projecting polar portions, such as 64 near one end 66 of the core, 67 and 68 intermediate the ends thereof, and 70 near the opposite end 71 of the core. Extending upwardly from the outer periphery of the core and adjacent the core end 66, is an arm or projection 72 formed by integral projections 74 on each of the laminae 62. The purpose served by the arm 72 will be described presently.

As shown by Fig. 1, the lateral extent or width of core 20 as measured axially of the rotor 32, is somewhat less than about half the axial length of the rotor poles, indicated generally at 75 in Fig. 1. Accordingly, in order to provide a full cooperation of the stator poles with the rotor poles, each of the core polar portions 64, 67, 68 and 70 is extended laterally and outwardly of one side 76 of the core, as by additional polar laminae 78 in the case of portions 67, 68 and 70, and laminae 79 in the case of polar portion 64. The additional polar laminae are secured to the polar portions of core 20 as by rivet elements 80, these rivets serving also, as assembly elements for the laminae 62 of core 20. Hence in assembly, the laminae 79 in cooperation with the polar projection 64 and the laminae 78 in cooperation with the polar projections 67, 68 and 70, provide four stator poles each heretofore indicated by the numeral 31. As clearly appears in Fig. 2, the stator poles 31 are angularly spaced in 90 degree relation with respect to the rotor axis, and as formed, are of a size to adequately and fully cooperate with the rotor poles 75. It is to be noted that the core structure 20 is formed of a suitable soft iron having low magnetic retentivity characteristics, whereby the poles 31 thereof may be alternately polarized and de-polarized during operation of the generator.

The laminae 79 while providing an extension of the polar projection 64, are formed to provide in assembly, an upstanding portion 81 which cooperates with the projection 72 to form a core leg 82 having a substantially wide face 83 for magnetic contact with an end portion 84 (Fig. 1) of the armature element or bar heretofore denoted as 24. The projections 72 and 81 may be retained in assembly by additional rivets or securing elements 86.

Stator core 22 is in structural respects, similar to core 20 hereinabove described, and includes polar projections heretofore designated as 31A, and a core leg 82A which presents a face 83A for magnetic contact with the end portion 87 of the armature bar 24 (Fig. 2). As in the case of the poles of core 20, the poles 31A of core 22 are likewise angularly spaced 90 degrees with respect to the rotor axis.

Fig. 3 illustrates the core members 20 and 22 in the relative positions which they occupy when embedded in the portion 19 of the magneto housing 12. In relating the core members for assembly, the cores are arranged side by side and oppositely to each other, such that the core legs 82 and 82A are uppermost and spaced apart, as shown. Further, the position of the legs is such that the respective faces 83 and 83A thereof lie in a common plane. With the cores thus arranged, it will be observed that a space or airgap 88 exists between the core members, while the end poles 31 and 31A adjacent the respective legs 82 and 82A, are uppermost and angularly spaced with respect to the axis of the rotor, by 45 degrees. All of the polar elements 31 of core 20 project laterally across, but out of contact with the core 22, while the corresponding poles 31A of core 22 project laterally across, but out of contact with the core 20, in the manner clearly shown by Fig. 3. Moreover the poles 31 and 31A are staggered with respect to each other, to provide in assembly, eight stator poles which are equally angularly spaced by 45 degrees, relative to the rotor axis.

As shown by Figs. 1 and 2, the stator elements related as above described, are firmly embedded in the wall portion 19 of the generator housing 12, this being done in any suitable manner, at the time the housing is cast. In casting, the metal of the housing wall portion 19 fills the space 88 between the core elements, as well as the space between the inner surface of each core and the laterally projecting portions of the polar elements. However, the inner peripheral extremities of the poles project inwardly of the housing wall 19, in a manner to present the polar faces thereof for full magnetic cooperation with the rotor structure. It is to be noted that the spacing of the cores at 88, and the spacing of the projecting polar portions of one core from the opposite core, provides in effect, air gaps which serve materially to reduce magnetic leakage between the parts, so that the rotor structure which provides the current generating energy for the magneto, may most effectively polarize the stator poles.

Constructing the stator assembly as herein described, provides for a compact but highly efficient armature member for the generator. The elements thereof while providing a plurality of poles, eight being shown in the present example, are so related in assembly as to occupy but a minimum of space, and at the same time to provide effective air gaps between parts thereof, to reduce flux losses through leakage, to a minimum. As a result, the overall dimension of the generator assembly and its housing, are considerably reduced, enabling the mounting of the generator in a limited space, as frequently is required in the structure of modern internal combustion engines, particularly such engines as are used on aircraft where space is at a premium.

Referring now to Figs. 7 through 11 which illustrate the preferred embodiment of the magneto rotor forming a part of this invention, the rotor includes a solid, unitary magnetic core 90 which is cast onto the shaft 34, the shaft preferably being formed of a non-magnetic material, such as a high tensile strength bronze alloy. In order to prevent cracking of the core, which otherwise would tend to result by reason of the difference in expansion coefficients between the materials of the core and shaft, a sleeve 91 of soft iron or other suitable material, is secured upon the shaft in any suitable manner, as by a key 92 (Fig. 8). The core 90 is then cast about the sleeve 91, and it is to be noted that the external surface of the sleeve may be knurled or roughened as shown, so as to effect an integral uniting of the cast core with the sleeve.

For a given capacity magneto, the improvements attained by the rotor structure forming a part of the present invention, are such as to enable the construction of a magneto substantially reduced in size over those heretofore prevailing, and at the same time attaining equal, if not better results, as well as a saving in material used. In accomplishing this end, the rotor core 90 is comprised of a unitary, cast body of a special magnet alloy known under the trade name "Alnico", the elements of which include in proper proportion, nickel, aluminum, chromium and iron. The characteristics of the alloy as compared to those of prevailing magnet materials, include a higher coercive force, greater energy, output, and a less response to the demagnetizing effects of stray fields, high temperatures and mechanical vibrations. Also, "Alnico" magnet alloy enables the use of a less volume of the metal in forming the rotor core for a magneto of a given capacity, thus permitting a marked saving in material.

Fig. 10 illustrates in perspective, the core 90 as cast onto the magneto shaft and sleeve assembly, the core in casting being formed to provide a plurality of equally spaced, radially projecting pole elements 94, providing open, longitudinal channels 95 therebetween. The radial extent of the polar projections may be substantially greater than that of the solid hub section 96 of the core, as shown by Figs. 7 and 10, although this may be altered to a greater or lesser extent according to predetermined required characteristics of the rotor magnetic circuit, providing however, that in any event sufficient sectional area is retained for the hub portion 96 to provide an adequate path for the magnetic flux lines.

In casting the rotor core 90, the peripheral end portion 98 of each polar projection 94 is outwardly flared along each longitudinal marginal edge, as at 99. These flared portions on each pole provide a partial locking engagement for a shallow, U-shaped pole shoe 100 of laminated, magnet-iron construction, which is seated upon the pole end 98 and in overlapping engagement with the flared edges 99. In fitting the pole shoes on the polar projections, the flared portions 99 may be ground in any suitable manner, so as to provide a close fit for the pole shoes. The pole shoes are then effectively retained in assembly with the projections 94 by a body 102 of insulating material, such as a phenolic condensate or "Bakelite", or other non-magnetic materials, which is cast in the core channels 95 and about the core ends, as shown in Figs. 7, 8 and 9. The end portions 103 of the body 102 serve effectively to compress the laminae of pole shoes 100. It is to be noted that before assembling the rotor in the magneto structure, the peripheral surfaces of the insulating body may be treated in any well known manner, so as to lie flush with and form a smooth continuation of the curved surfaces of pole shoes 100. Upon completing the rotor structure, the magnetic portion thereof is permanently magnetized to provide permanent, alternate north and south poles.

In the operation of the generator, it will be observed that by reason of the eight pole structure, the magnetic flux of the rotor magnets will be reversed eight times through the armature bar 24, for each revolution of the rotor. Thus eight impulses of maximum current are produced during each revolution of the rotor. As a consequence, the inductive effect of the stator windings 26 is materially increased, a factor which is of great importance in an induction type of generator, particularly when used for supplying ignition current for internal combustion engines.

The improved induction generator or magneto embodying the features herein described and illustrated, fully attains the objects of the invention, in providing a compact and highly efficient generator for ignition or other purposes, and one which effects a saving in material without impairing the desired operating characteristics for a given capacity magneto.

It is to be understood that only the preferred embodiments of the invention are described and shown herein, and that alterations and modifications in the parts and arrangement thereof, may be effected without departing from the spirit and full intended scope of the invention, as defined by the claim appended hereto.

I claim:

In a magneto-electric generator including a unitary, cast metal housing, a rotor member rotatably supported in said housing and having polar elements of a predetermined axial length, a stator structure embedded in said cast housing and functionally cooperating with said rotor, said stator structure being comprised of complemental, laminated core members arranged in spaced, parallel adjacence, and each having a plurality of stator pole elements directed inwardly of the housing, said pole elements being circumferentially staggered with respect to each other and each being of a length as measured in a direction axially of the rotor, substantially equivalent to the length of a rotor pole element, such that the stator poles of one core member project over the adjacent core member, whereby to attain a full functional cooperation of each stator pole with the polar elements of the rotor, each of said stator core members having a terminal projection of a length as measured axially of the rotor, substantially equivalent to the length of its stator poles, and a member carrying an induction coil bridging said terminal projections.

CURT F. REIS.